United States Patent [19]

Pichat et al.

[11] Patent Number: 4,523,954
[45] Date of Patent: Jun. 18, 1985

[54] PROCESS FOR MANUFACTURING CELLULAR PLASTER AND MOLDED PLASTER ARTICLES

[75] Inventors: Philippe Pichat, Paris; Michel Niel, Annezin; Robert Sinn, Lens, all of France

[73] Assignee: CDF Chimie, S.A., Paris, France

[21] Appl. No.: 433,767

[22] Filed: Oct. 12, 1982

Related U.S. Application Data

[63] Continuation-in-part of Ser. No. 283,324, Jul. 15, 1981, abandoned.

[30] Foreign Application Priority Data

Jul. 16, 1980 [FR] France ............................ 80 15653

[51] Int. Cl.³ .................. C04B 11/00; C04B 1/00; C01F 11/46
[52] U.S. Cl. .................................. 106/110; 106/118; 423/555
[58] Field of Search ............... 423/168, 555, 170, 171, 423/172; 106/109, 110, 118

[56] References Cited

U.S. PATENT DOCUMENTS

| | | | |
|---|---|---|---|
| 1,713,868 | 5/1929 | Edwards | 423/555 |
| 1,900,381 | 3/1933 | Hansen | 423/555 |
| 2,529,835 | 11/1950 | Dailey | 106/109 |
| 3,024,123 | 3/1962 | Theilacker et al. | 106/109 |
| 3,489,583 | 1/1970 | Bloom et al. | 106/109 |
| 3,574,648 | 4/1971 | Wirsching et al. | 106/110 |
| 3,834,917 | 9/1974 | Speckelmeyer et al. | 423/555 |
| 3,847,634 | 11/1974 | Vickery | 106/110 |
| 3,950,181 | 4/1976 | Pilgrim | 106/109 |
| 4,040,850 | 8/1977 | Kyri et al. | 106/110 |
| 4,043,825 | 8/1977 | Muller et al. | 106/110 |
| 4,161,855 | 7/1979 | Mulvey et al. | 106/88 |
| 4,193,812 | 3/1980 | Casper et al. | 106/110 |
| 4,233,080 | 11/1980 | Koeppel | 106/109 |
| 4,240,839 | 12/1980 | Crepeau et al. | 106/111 |
| 4,341,560 | 7/1982 | Saito et al. | 106/87 |
| 4,411,701 | 10/1982 | Saito et al. | 106/87 |

FOREIGN PATENT DOCUMENTS

| | | | |
|---|---|---|---|
| 1811177 | 6/1970 | Fed. Rep. of Germany | . |
| 2617574 | 10/1976 | Fed. Rep. of Germany | 106/110 |
| 2059413 | 4/1981 | Fed. Rep. of Germany | 106/109 |
| 2211001 | 12/1972 | France | 106/110 |
| 2201387 | 4/1974 | France | . |
| 2211001 | 7/1974 | France | . |
| 48-31741 | 10/1973 | Japan | 106/109 |
| 49-132131 | 12/1974 | Japan | 106/109 |
| 50-22570 | 7/1975 | Japan | 106/109 |
| 53-6327 | 1/1978 | Japan | 106/109 |
| 109128 | 3/1925 | Switzerland | . |

Primary Examiner—Gary P. Straub
Attorney, Agent, or Firm—Millen & White

[57] ABSTRACT

A process for manufacturing a cellular plaster with plaster obtained by calcining phosphogypsum, comprising mixing dry plaster with a previously prepared aqueous foam and with about 0.1–5% by weight, relative to the dry plaster, of slaked lime.

8 Claims, No Drawings

PROCESS FOR MANUFACTURING CELLULAR PLASTER AND MOLDED PLASTER ARTICLES

CROSS-REFERENCE TO RELATED APPLICATION

This application is a continuation-in-part of copending application U.S. Ser. No. 283,324, filed July 15, 1981, now abandoned.

BACKGROUND OF THE INVENTION

The present invention relates to an improved process for manufacturing cellular plaster obtained by calcining phosphogypsum.

Phosphogypsum is a by-product of the commercial production of phosphoric acid by reacting sulfuric acid with phosphate rocks.

It is already known to prepare cellular plaster by mixing plaster with a foam obtained by stirring water with a surfactant. Cellular plaster has already been prepared by mechanically mixing plaster, water and the foaming agent, the foam being prepared in situ. It is also known to prepare the foam separately by stirring the surfactant with part of the water necessary for wetting the plaster, the foam being added to the partly wetted plaster.

The foam is preferably mixed with dry plaster, the whole quantity of water necessary for wetting plaster being introduced as foam. The latter process has the advantage of providing a cellular plaster having improved mechanical characteristics.

It is also already known to add to the plaster mixture, at any step of the manufacture process, additives such as colloids, fungicides, waterproofing agents and/or retardants.

SUMMARY OF THE INVENTION

The present invention relates to an improvement in the process for the manufacture of cellular plaster by mixing plaster obtained by calcining gypsum, according to which dry plaster is mixed with previously prepared foam.

According to the process of the present invention a quantity of slaked lime of about 0.1–5% by weight relative to the dry plaster is added.

It has been observed that the addition of slaked lime improves the bending strength and compressive strength of the cellular plaster, for a given density, and of molded plaster articles produced therefrom.

The quantity of slaked lime to be added depends upon the quality of the phosphogypsum used to manufacture the plaster. But for quantities of slaked lime lower than 0.1%, no noticeable improvement of the mechanical characteristics is observed whatever type of phosphogypsum is used to prepare the plaster. For quantities higher than 5%, the characteristics are generally no more improved and in some cases even impaired.

Improvements are obtained with both the alpha and beta forms of the calcium sulfate hemihydrate of the formula $CaSO_4.\frac{1}{2}H_2O$ and with the anhydrite of the formula $CaSO_4$, which are obtained by calcining neutral phosphogypsum. It must be noted that no noticeable improvement is observed with natural gypsum.

The calcined plaster must have a pH of at least 5 in aqueous suspension, regardless of the initial pH of the phosphogypsum from which it is obtained. If the phosphogypsum is acidic, it must first be neutralized By e.g. repeated washing, optionally in the presence of alkali or other alkaline salts. If after calcination in place thereof phosphogypsum plaster is still acidic, it must be neutralised again in order to have a pH of at least to 5 in aqueous suspension: indeed if phosphogypsum plaster has a pH lower than 5, it is not possible to use it for known applications, e.g., coatings of walls or ceilings.

Slaked lime can be added to the dry plaster before mixing with the foam or it can be added separately during the mixing step.

The surfactants used as foaming agents are natural or synthetic, non-ionic, anionic or cationic. Saponine can be cited as a natural agent and alcohol alkyl sulfates, alkylether sulfates, nonylphenoxyether sulfates, alkylbenzenesulfonates, ethoxylated fatty alcohols, ethoxylated fatty acids, sodium salts of alkyl naphthalenesulfonic acids or linear alpha-ethylenesulfonates can be cited as synthetic foaming agents.

Conventional additives can be added in addition to slaked lime. Such additives include, in particular, colloid agents. Their presence improves the homogeneity of the obtained foam and avoids obtaining a cellular plaster having a density gradient. Suitable such added colloid agents include the known agents bone-glue, gum arabic, modified starches, carboxymethylcellulose, methylcellulose, methylhydroxymethylcellulose, hydroxyethylcellulose, methylhydroxyethylcellulose and methylhydroxypropylcellulose. Other agents can also be used, such as silicone oils, or vinyl or acrylic polymers or copolymers, in particular, methyl methacrylate, butyl methacrylate or butyl acrylate. Fungicidal agents also can be added.

The process of the present invention is achieved by adding to the plaster the necessary amount of slaked lime. Preferably this necessary amount of slaked lime is added when the plaster is mixed with water. It is also possible to add the slaked lime to the dry plaster and then add the mixture to the foam.

The foam is manufactured separately. It is obtained by mechanical stirring or by using foam generators. In these foam generators, an excellent dispersion of injected air in the aqueous solution is obtained by passing the solution through pipes filled with small balls, coils of tubing, mesh and the like, or through pipes of the static mixer type.

The mixture of foam and plaster containing slaked lime is produced by using known mechanical stirring apparatus. Suitable such stirring apparatus includes marine screw type stirrers, whip stirrers, blade stirrers or plowshare type stirrers.

All additives other than slaked lime can be added at any step of the process. Generally, when using a retardant, which is most often necessary to achieve industrial manufacturing cycles, the resultant cellular plaster has slightly altered mechanical properties.

Cellular plaster obtained by using the process of the present invention is suitable for manufacturing blocks or panels and generally for manufacturing light, insulating and fire-proof material. In particular, this cellular plaster is suitable for manufacturing walls, dividing walls, floors and in particular for manufacturing rough-masonry. It is also possible, by using conventional machines known to the plaster industry, to project the plaster on concrete or parpen walls.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLES

Foam was prepared by adding to water an anionic surface active agent, sold by the SEPPIC Company under the Trademark "SIMULSOL". After dispersing the surfactant in water, the mixture was stirred for two minutes by using a whip stirring apparatus which was run at 1,450 revolutions per minute. A dry plaster manufactured by phosphogypsum calcination and having a pH of about 5, was added to the resultant foam, along with slaked lime. The mixture was stirred for one minute, then poured in a mold having the following dimensions: $4 \times 4 \times 16$ cm.

After drying for 48 hours in a drying-room maintained at 50° C., bending strength and compressive strengths were determined according to French Standard NF B 12401.

The results are given in the following table. Amounts are given in parts by weight. Retardant "P" is an additive sold by the GRUNAU Company, and contains modified proteins. "Tylose" is the water soluble methylhydroxypropylcellulose sold by HOECHST.

The preceding examples can be repeated with similar success by substituting the generically or specifically described reactants and/or operating conditions of this invention for those used in the preceding examples. From the foregoing description, one skilled in the art can easily ascertain the essential characteristics of this invention, and without departing from the spirit and scope thereof, can make various changes and modifications of the invention to adapt it to various usages and conditions.

| N° of test | Composition (parts by weight) | | slaked Time (percent by weight relative to plaster) | Density (kg/dm$^3$) | Bending strength (kg/cm$^2$) | Compressive strength (kg/cm$^2$) |
|---|---|---|---|---|---|---|
| 1 | Water | 450 | 0% | 0.510 | 6.4 | 10.0 |
| | "Simulsol" | 0.148 | | | | |
| | Tylose | 0.019 | | | | |
| | Plaster | 475 | | | | |
| | Retardative agent P | 0.140 | | | | |
| 2 | Water | 450 | 0% | 0.469 | 5.4 | 7.3 |
| | "Simulsol" | 0.174 | | | | |
| | Tylose | 0.019 | | | | |
| | Plaster | 475 | | | | |
| | Retardative agent P | 0.140 | | | | |
| 3 | Water | 450 | 0.5% | 0.505 | 7.4 | 11.5 |
| | "Simulsol" | 0.150 | | | | |
| | Tylose | 0.019 | | | | |
| | Plaster | 475 | | | | |
| | Retardative agent P | 0.140 | | | | |
| 4 | Water | 465 | 3% | 0.510 | 9.3 | 14.9 |
| | "Simulsol" | 0.235 | | | | |
| | Tylose | 0.019 | | | | |
| | Plaster | 475 | | | | |
| | Retardative Agent P | 0.040 | | | | |
| 5 | Water | 465 | 3% | 0.474 | 8.8 | 12.7 |
| | "Simulsol" | 0.279 | | | | |
| | Tylose | 0.019 | | | | |
| | Plaster | 475 | | | | |
| | Retardative agent P | 0.140 | | | | |
| 6 | Water | 475 | 5% | 0.510 | 10.1 | 15.2 |
| | "Simulsol" | 0.282 | | | | |
| | Tylose | 0.019 | | | | |
| | Plaster | 475 | | | | |
| | Retardative agent P | 0.140 | | | | |
| 7 | Water | 496 | 10% | 0.515 | 9.0 | 14.8 |
| | "Simulsol" | 0.255 | | | | |
| | Tylose | 0.019 | | | | |
| | Plaster | 475 | | | | |
| | Retardative agent P | 0.140 | | | | |
| 8 | Water | 500 | 30% | 0.482 | 5.9 | 8.5 |
| | "Simulsol" | 0.300 | | | | |
| | Tylose | 0.019 | | | | |
| | Plaster | 475 | | | | |
| | Retardative agent P | 0.140 0.140 | | | | |

What is claimed is:

1. In a process for producing cellular plaster, comprising mechanically admixing dry plaster with an aqueous foam, said dry plaster being obtained by calcining a neutralized phosphogypsum and having a pH in aqueous suspension of at least about 5, the improvement which comprises incorporating in the admixture of said plaster and said foam about 0.1-5% by weight, relative to the dry plaster, of slaked lime, by adding said slaked lime to said dry plaster prior to admixture with said foam, or by adding said slaked lime separately during said admixing, to increase the bending strength and compressive strength of the resultant cellular plaster for a given plaster density.

2. A process according to claim 1, wherein said plaster is in the form of calcium sulfate alpha hemihydrate.

3. A process according to claim 1, wherein said plaster is in the form of calcium sulfate beta hemihydrate.

4. A process according to claim 1, wherein said slaked lime is added to said dry plaster prior to admixture with said foam.

5. A process according to claim 1, wherein said slaked lime is added separately during said admixing.

6. A process according to claim 1, wherein the amount of said added slaked lime is 0.5-5%.

7. A process according to claim 6, wherein said amount is 3-5%.

8. A process according to claim 1, wherein at least one colloid agent is added to said admixture in an amount sufficient to avoid a density gradient in the resultant cellular plaster.

* * * * *